(12) United States Patent
Setlak

(10) Patent No.: US 7,351,974 B2
(45) Date of Patent: Apr. 1, 2008

(54) INTEGRATED CIRCUIT INFRARED SENSOR AND ASSOCIATED METHODS

(75) Inventor: Dale R. Setlak, Melbourne, FL (US)

(73) Assignee: Authentec, Inc., Melbourne, FL (US)

( * ) Notice: Subject to any disclaimer, the term of this patent is extended or adjusted under 35 U.S.C. 154(b) by 185 days.

(21) Appl. No.: 11/225,140

(22) Filed: Sep. 13, 2005

(65) Prior Publication Data

US 2006/0062439 A1 Mar. 23, 2006

Related U.S. Application Data

(63) Continuation-in-part of application No. 10/935,468, filed on Sep. 3, 2004.

(60) Provisional application No. 60/500,475, filed on Sep. 5, 2003, provisional application No. 60/536,305, filed on Jan. 14, 2004, provisional application No. 60/609,542, filed on Sep. 13, 2004.

(51) Int. Cl.
*G01J 5/02* (2006.01)

(52) U.S. Cl. ............................... 250/341.1; 250/341.2; 374/10

(58) Field of Classification Search .. 250/341.1–341.6; 374/10
See application file for complete search history.

(56) References Cited

U.S. PATENT DOCUMENTS

| 4,394,773 | A | 7/1983 | Ruell ............................. 382/4 |
| 4,472,594 | A | 9/1984 | Ishida ......................... 136/201 |
| 4,582,985 | A | 4/1986 | Lofberg ....................... 235/380 |
| 5,067,162 | A | 11/1991 | Driscoll, Jr. et al. ............. 382/5 |
| 5,288,147 | A | * 2/1994 | Schaefer et al. ............... 374/10 |

(Continued)

FOREIGN PATENT DOCUMENTS

DE 10128717 12/2002

(Continued)

OTHER PUBLICATIONS

Patent Abstracts of Japan; Inventor: Sai Meirin; "Temperature Difference Detecting Cell and Fingerprint Thermograph Reader Using it", Publication No. 2004033610 published Feb. 5, 2004; vol. 2003, No. 12.

(Continued)

*Primary Examiner*—David Porta
*Assistant Examiner*—Casey Bryant
(74) *Attorney, Agent, or Firm*—Allen, Dyer, Doppelt, Milbrath & Gilchrist, P.A.

(57) ABSTRACT

An integrated circuit sensor may include at least one infrared sensing element on a substrate. The sensing element may include at least one first thermocouple junction heated from infrared radiation, at least one second thermocouple junction connected to the first thermocouple junction, and a controller. The controller may detect a temperature difference between the first and second thermocouple junctions, and may pump heat therebetween to drive the detected temperature difference toward a desired value. The controller may also generate an infrared radiation output signal based upon the heat pumped. The controller may alternatingly switch between detecting the temperature difference and pumping heat, and the desired temperature difference may be zero. The sensor is readily made using integrated circuit processing technology, and may, for example, be used in many types of applications, such as biometric identification by including biometric processing circuitry connected to the controller.

36 Claims, 11 Drawing Sheets

U.S. PATENT DOCUMENTS

| | | | |
|---|---|---|---|
| 5,325,442 A | 6/1994 | Knapp | 382/4 |
| 5,351,303 A | 9/1994 | Willmore | 382/2 |
| 5,645,349 A | 7/1997 | Fraden | 374/120 |
| 5,689,087 A | 11/1997 | Jack | 136/213 |
| 5,689,576 A | 11/1997 | Schneider et al. | 382/124 |
| 5,714,791 A | 2/1998 | Chi et al. | 257/467 |
| 5,737,439 A | 4/1998 | Lapsley et al. | 382/115 |
| 5,909,501 A | 6/1999 | Thebaud | 382/124 |
| 5,940,526 A | 8/1999 | Setlak et al. | 382/124 |
| 5,953,441 A | 9/1999 | Setlak | 382/124 |
| 6,046,398 A | 4/2000 | Foote et al. | 136/201 |
| 6,118,890 A | 9/2000 | Senior | 382/125 |
| 6,121,618 A | 9/2000 | Morris | 250/352 |
| 6,134,340 A | 10/2000 | Hsu et al. | 382/124 |
| 6,241,288 B1 | 6/2001 | Bergenek et al. | 283/67 |
| 6,289,114 B1 | 9/2001 | Mainguet | 382/124 |
| 6,327,376 B1 | 12/2001 | Harkin | 382/124 |
| 6,483,929 B1 | 11/2002 | Murakami et al. | 382/115 |
| 6,546,122 B1 | 4/2003 | Russo | 382/125 |
| 6,560,352 B2 | 5/2003 | Rowe et al. | 382/115 |
| 6,565,254 B2 | 5/2003 | Sato et al. | 374/132 |
| 6,765,210 B2 | 7/2004 | Oda | 250/338.3 |
| 6,909,093 B2 | 6/2005 | Sato et al. | 250/338.4 |
| 2002/0067845 A1 | 6/2002 | Griffis | 382/107 |
| 2002/0076089 A1 | 6/2002 | Muramatsu et al. | 382/124 |
| 2002/0138768 A1 | 9/2002 | Murakami et al. | 713/202 |
| 2003/0123714 A1 | 7/2003 | O'Gorman et al. | 382/124 |
| 2003/0126448 A1 | 7/2003 | Russo | 713/186 |
| 2003/0169910 A1 | 9/2003 | Reisman et al. | 382/124 |
| 2005/0069180 A1 | 3/2005 | Setlak et al. | 382/124 |

FOREIGN PATENT DOCUMENTS

| | | |
|---|---|---|
| EP | 1 045 233 | 10/2000 |
| EP | 1045233 | 10/2000 |
| WO | WO03/056502 | 7/2003 |

OTHER PUBLICATIONS

"Guide to Biometrics", Ruud M. Bolle, 2004, Springer, New York, USA, XP002347674, p. 94-96.

"Automatic Fingerprint Recognition Systems", Ratha et al., 2004, Springer, New York, USA, XP002347781, p. 27-53.

"Handbook of Fingerprint Recognition", Maltoni et al., Jun. 2003, Springer, New York, USA, XP0023498094, p. 59-65.

"Imaging Antenna Arrays", Rutledge et al., IEEE Transactions on Antennas and Propagation USA, vol. AP-30, No. 4, Jul. 1982, pp. 535-540, XP008039687, ISSN: 0018-926X.

"Antenna-Coupled Polycrystalline Silicon Air-Bridge Thermal Detector for Mid-Infrared Radiation", Chong et al., Applied Physics Letters AIP USA, vol. 71, No. 12, Sep. 22, 1997, pp. 1607-1609, XP008039674, ISSN: 003-6951.

"Zugangskontrolle Bei Biometrischen Zugangssystemen", Stetter et al., Siemens Technik Report, vol. 2, No. 3, Apr. 1999, pp. 9-11, XP007001785.

"Nichtinvasive Bestimmung Personenspezifischer Werte", Abraham-Fuchs et al., Siemens Technik Report, vol. 3, No. 6, Jan. 2000, pp. 10-11, XP007001985.

Bazen et al., *A Correlation-Based Fingerprint Verification System*, Proceedings of Workshop on Circuits Systems and Signal Processing, pp. 205-213, 2000.

Kovacs-Vanja, *A Fingerprint Verification System Based on Triangular Matching and Dynamic Time Warping*, IEEE Transactions on Pattern Analysis and Machine Intelligence, vol. 22, No. 11, Nov. 2000, pp. 1266-1276.

Coetzee et al., *Fingerprint Recognition in Low Quality Images*, Pattern Recognition, vol. 26, No. 10, pp. 1441-1460, 1993.

Halici et al., *Fingerprint Classification through Self-Organizing Feature Maps Modified to Treat Uncertainties*, Proceedings of the IEEE, vol. 84, No. 10, pp. 1497-1512, Oct. 1996.

Cappelli et al., *Fingerprint Classification by Directional Image Partitioning*, IEEE Transactions on Pattern Analysis and Machine Intelligence, vol. 21, No. 5, pp. 402-421, May 1999.

Almansa et al., *Fingerprint Enhancement by Shape Adaptation of Scale-Shape Operators with Automatic Scale Selection*, IEEE Transactions on Image Processing, vol. 9, No. 12, pp. 2027-2042, Dec. 2000.

Hong et al., *Fingerprint Image Enhancement: Algorithm and Performance Evaluation*, IEEE Transactions on Pattern Analysis, vol. 20, No. 8, pp. 777-789, Aug. 1998.

O'Gorman et al., *An Approach to Fingerprint Filter Design*, Pattern Recognition, vol. 22, No. 1, pp. 29-38, 1989.

Ratha et al., *Image Mosiacing for Rolled Fingerprint Construction*, 14th International Conference on Pattern Recognition-vol. 2, Aug. 16-20, 1998, Brisbane, Australia.

Yau et al., *On Fingerprint Template Synthesis*, Proceedings of Sixth International Conference on Control, Automation, Robotics and Vision (ICARCV 2000), Singapore. Dec. 5-8, 2000.

Brown, *A Survey of Image Registration Techniques*, Department of Computer Science, Columbia University, ACM Computing Surveys, vol. 24, No. 4, Dec. 1992.

Jain et al., *Fingerprint Mosaicking*, Proc. International Conference on Acoustic Speech and Signal Processing (ICASSP), Orlando, Florida, May 13-17, 2002.

Maltoni et al., *Handbook of Fingerprint Recognition*, Section 2.5, Touch Versus Sweep, pp. 65-69, Springer-Verlag, New York, 2003.

\* cited by examiner

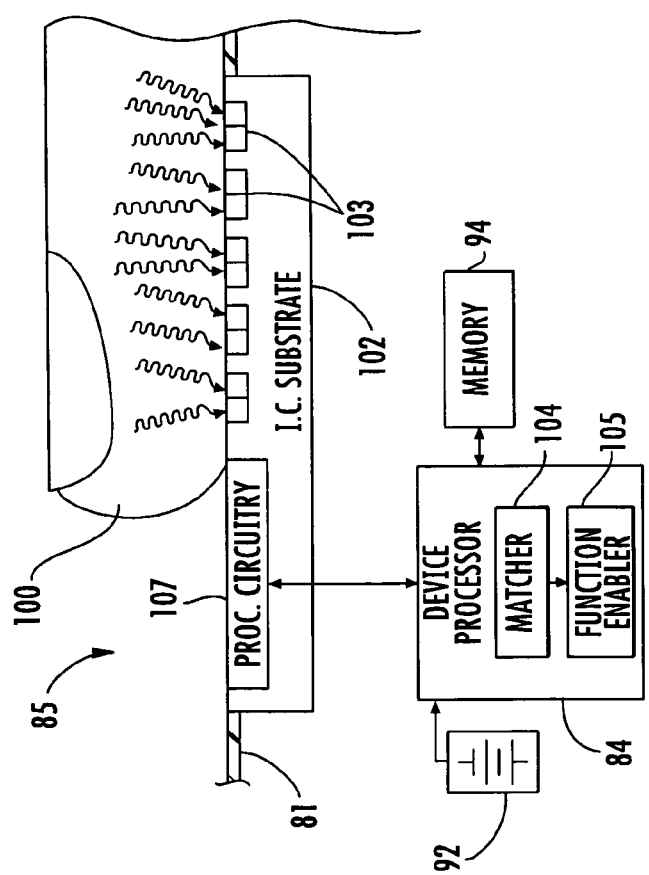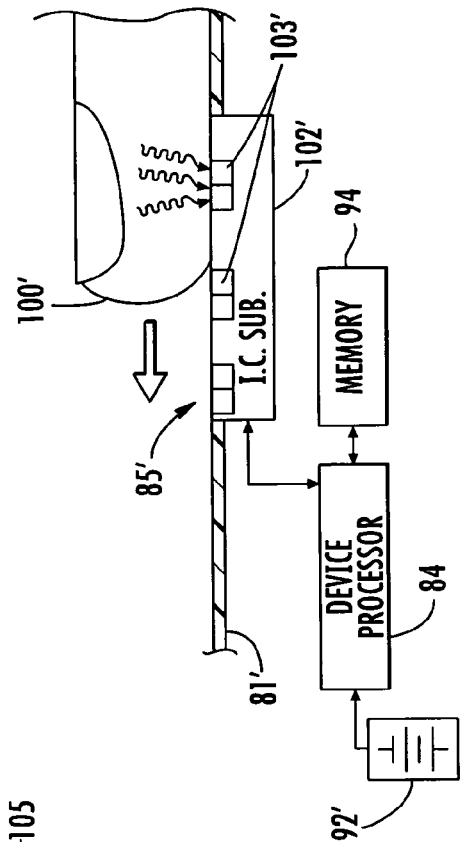

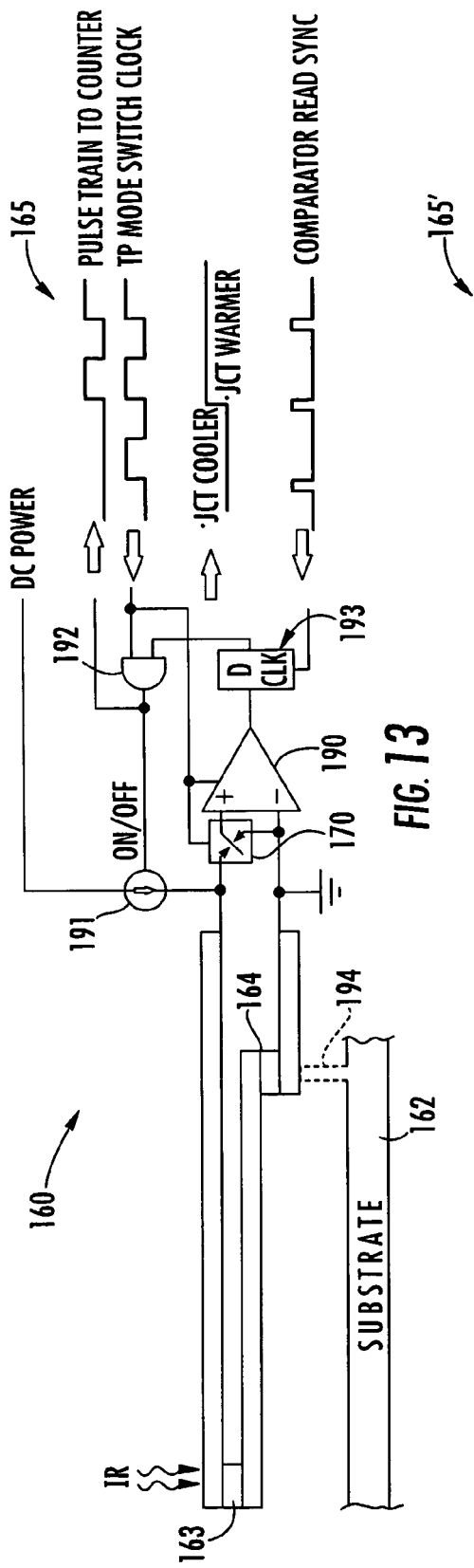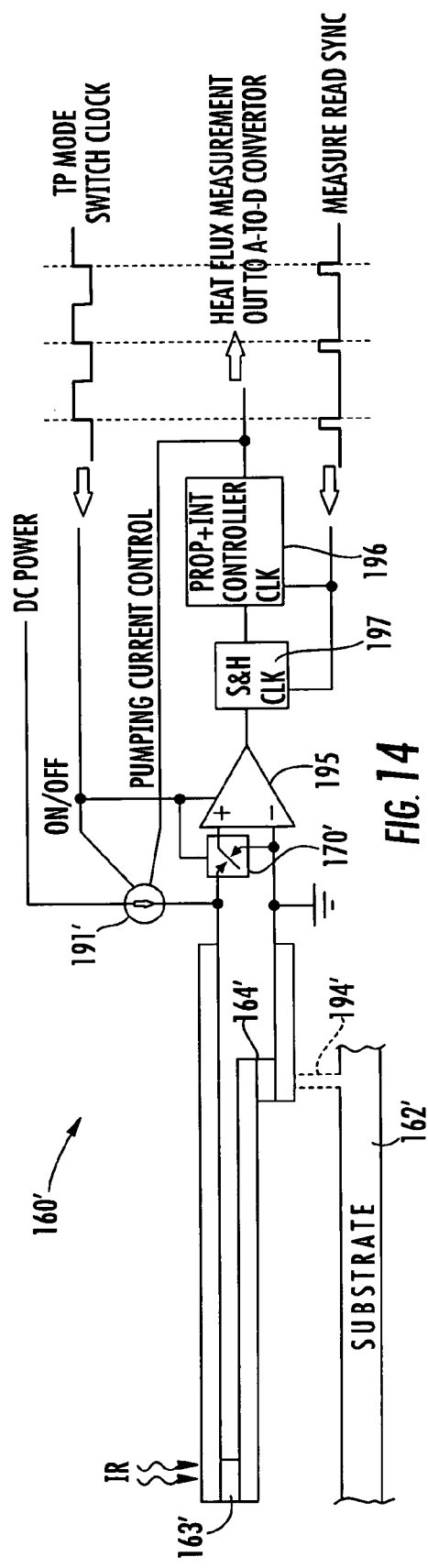
FIG. 13
FIG. 14

INTEGRATED CIRCUIT INFRARED SENSOR AND ASSOCIATED METHODS

RELATED APPLICATIONS

The present application is a continuation-in-part application of U.S. patent application Ser. No. 10/935,468, filed Sep. 3, 2004 which is based on U.S. Provisional Application Ser. No. 60/500,475, filed Sep. 5, 2003 and U.S. Provisional Application Ser. No. 60/536,305 filed Jan. 14, 2004; and is based upon U.S. Provisional Patent Application Ser. No. 60/609,542 filed Sep. 13, 2004; the entire disclosures of each of which are incorporated herein by reference.

FIELD OF THE INVENTION

The present invention relates to sensors, and, more particularly, to sensors for infrared radiation and associated methods.

BACKGROUND OF THE INVENTION

Infrared thermal imaging is commonly used for various applications. For example, Published U.S. patent application Ser. No. 2005/0069180 to Setlak et al. and assigned to the assignee of the present invention, discloses significant advances in infrared imaging for biometric identification of a user's finger. The entire contents of the Setlak et al. application are incorporated herein by reference along with its related applications, Nos. 2005/0089203; 2005/0089202; 2005/0069181; 2005/0063573; 2005/0063572; and 2005/0063571. The infrared imaging described by Setlak et al. includes thermopile sensing pixels that can be used either alone or in combination with other biometric sensing techniques for enhanced accuracy.

Other uses for infrared sensors include automotive, spectroscopic and general imaging application as described, for example, in U.S. Pat. No. 5,689,087 to Jack. In infrared thermal imaging systems typical engineering practice is to minimize the heat flux away from the thermal pickup elements by a variety of thermal isolation methods. The temperature of the thermal sensing elements is allowed to stabilize, hopefully approaching that of the heat source target, and then that temperature is measured. Typical methods of thermally isolating the sensing elements include: back thinning of the semiconductor wafers behind the sensing elements, micromachining void spaces around the sensing elements, floating the sensing elements, etc. Unfortunately, these methods may not be available inexpensively in standard semiconductor foundry processing. These methods may also suffer losses due to the heat conduction across the suspension members and across the measurement connections. The '087 patent to Jack, for example, discloses that the hot junction is thermally isolated from the substrate by being suspended from the substrate on dielectric bridges or, in another embodiment, by a thermally insulating and patterned polymer.

European Published Patent Application No. 1,045,233 A2 discloses an infrared sensor including a flexible diaphragm that may be disposed over a cavity, a thermoelectric element that converts heat to an electrical signal, and an electrothermic element that converts an electrical signal to heat. The thermoelectric element is on the diaphragm and the electrothermic element is on the diaphragm adjacent the thermoelectric element. A reference signal is supplied that is compared with the output of the thermoelectric element for controlling the driving of the electrothermic element. The reference signal and the output signal are compared and the electrothermic element is driven to compensate for the difference between the two signals. Accordingly, the electrothermic element is controlled so as to offset the energy that is detected by the thermoelectric element more rapidly than the thermal response of the diaphragm, thereby eliminating the temperature changes in the diaphragm. The application notes that free of the influence of the thermal time constant of the diaphragm, the response speed with respect to incident infrared light can be greatly improved and the linearity of the thermoelectric conversion can be improved.

Unfortunately, the approach described in the EP 1,045,233 published application requires separate sensing and temperature control elements to be positioned on the diaphragm, and the diaphragm may still use a cavity therebeneath. In addition, many of the conventional approaches to thermal isolation of the sensing elements make use of complicated processing techniques. Such techniques also typically suffer from losses due to the heat conduction across suspension members and across the measurement connections.

SUMMARY OF THE INVENTION

In view of the foregoing background, it is therefore an object of the present invention to provide an integrated circuit sensor and associated methods for infrared radiation sensing that is readily implemented using integrated circuit processing technology.

This and other objects, features and advantages in accordance with the present invention are provided by an integrated circuit sensor comprising at least one infrared sensing element on a substrate and including at least one first thermocouple junction heated from infrared radiation, at least one second thermocouple junction connected to the at least one first thermocouple junction, and a controller. More particularly, the controller may detect a temperature difference between the at least one first thermocouple junction and the at least one second thermocouple junction, and may pump heat between the at least one first thermocouple junction and at least one second thermocouple junction to drive the detected temperature difference toward a desired value. The controller may also generate an infrared radiation output signal based upon the heat pumped. For example, the controller may alternatingly switch between detecting the temperature difference and pumping heat, and the desired temperature difference may be zero. The sensor may be readily made using integrated circuit processing technology, and may, for example, be used in many types of applications, such as biometric identification, by including biometric processing circuitry connected to the controller.

The controller may comprise a detector for detecting a voltage between the at least one first thermocouple junction and the at least one second thermocouple junction indicative of a temperature difference therebetween, and a driver for driving current through the at least one first thermocouple junction and the at least one second thermocouple junction to pump heat therebetween. The controller may also include a switcher for alternatingly switching the at least one first thermocouple junction and the at least one second thermocouple junction between the detector and the driver, and a regulator to operate the driver responsive to the detector so that the detected voltage is driven toward zero. In addition, the controller may include a reader connected to the driver for determining the drive current provided thereby indicative of the heat pumped.

The at least one second thermocouple junction may be thermally coupled to the substrate via a lower thermal resistance than the at least one first thermocouple junction. The integrated circuit sensor may further comprise at least one solid layer between the substrate and the at least one first thermocouple junction so that there is no void therebetween. This may greatly streamline manufacturing and/or reduce manufacturing costs. For example, the at least one solid layer may comprise at least one oxide layer, such as silicon oxide widely used as an interlevel dielectric in integrated circuit processing.

The at least one infrared sensing element may comprise a plurality thereof for many typical applications. Accordingly, the second thermocouple junctions of the plurality of infrared sensing elements may be thermally coupled to the substrate. The at least one infrared sensing element may further comprise an infrared radiation antenna thermally coupled to the at least one first thermocouple junction.

The at least one first thermocouple junction may include a plurality thereof connected together. The at least one second thermocouple junction may also include a plurality thereof connected together in a thermopile arrangement to generate larger signal amplitudes.

Another aspect of the invention is directed to a method for infrared sensing using an integrated circuit sensor. As noted above, the integrated circuit sensor may include a substrate and at least one infrared sensing element on the substrate. The at least one infrared sensing element may comprise at least one first thermocouple junction heated from infrared radiation, and at least one second thermocouple junction connected to the at least one first thermocouple junction. The method may include detecting a temperature difference between the at least one first thermocouple junction and the at least one second thermocouple junction; pumping heat between the at least one first thermocouple junction and at least one second thermocouple junction to drive the detected temperature difference toward a desired value; and generating an infrared radiation output signal based upon the heat pumped.

BRIEF DESCRIPTION OF THE DRAWINGS

FIG. 3 is a more detailed schematic diagram, partially in section, of a portion of the electronic device as shown in FIG. 1.

FIG. 4 is a more detailed schematic diagram, partially in section, of a portion of the electronic device as shown in FIG. 2.

FIG. 13 is a more detailed schematic diagram of an embodiment of the infrared sensing pixel and associated controller as shown in FIG. 12.

FIG. 14 is a more detailed schematic diagram of another embodiment of the infrared sensing pixel and associated controller as shown in FIG. 12.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime and multiple prime notation are used to indicate similar elements in alternate embodiments.

In accordance with the present invention, the infrared sensor may measure the heat flux impinging on the sensor rather than the temperature of the sensor to reduce the need for high-quality thermal isolation. The heat pumping may cool (or raise) the temperature of the sensing element to that of the substrate, reducing the temperature difference to near zero and hence the heat loss through other mechanisms to near zero. A closed loop control system may be used to drive the heat pump to produce a null temperature difference between the sensing element and the substrate, hence this is a form of balanced differential measurement.

In this case essentially all of the incident heat flux may flow through the heat pump, and a measurement of the energy expended to pump that heat is a measurement of the incident heat flux on the sensor. As in other differential nulling measurements the first order error may be largely a function of the control loop gain and offset, which can be readily controlled using standard electronic circuit design practices. This concept allows the fabrication of infrared sensors on standard process substrates without the need for special processing to produce high quality thermal isolation. Using this method, the thermal isolation supplied by standard silicon dioxide integrated circuit dielectric materials may be sufficient to allow sensitive and accurate measurements. It is particularly applicable to arrays of infrared sensors where the parameter of interest is the relative difference between the individual pixels in the array and the average of all the pixels in the array.

Figure 1:
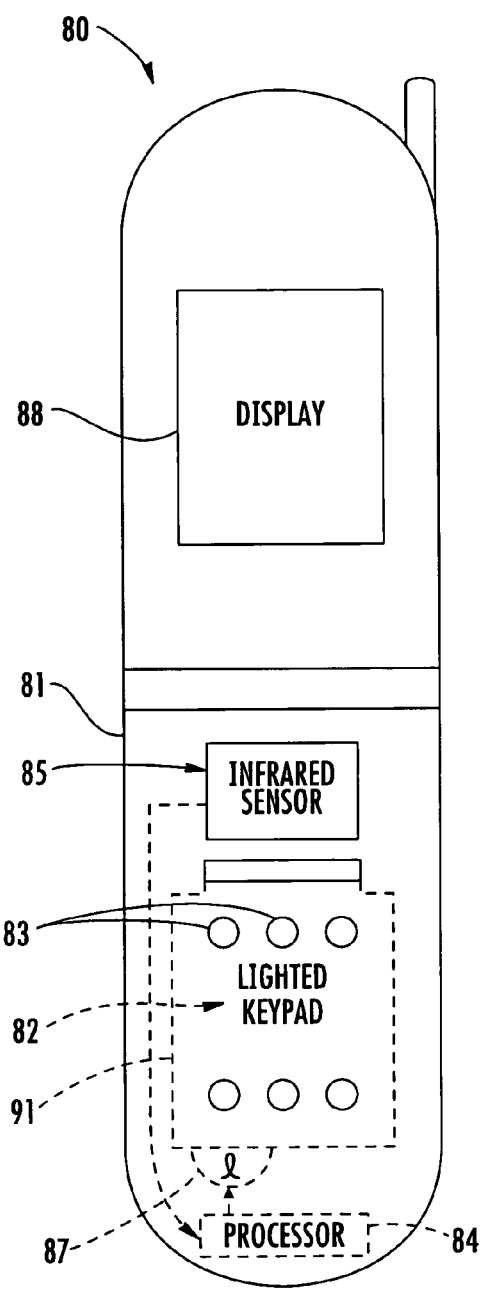
FIG. 1 is a schematic diagram of a first embodiment of an electronic device including an infrared finger sensor in accordance with the present invention.

Referring now to FIGS. 1-4, various embodiments of infrared sensing pixel finger sensors 85, 85' are first described. With particular reference to FIGS. 1 and 3, the electronic device is in the exemplary form of a cellular telephone 80 that includes a portable housing 81. The portable housing 81 carries an infrared finger sensor 85, and a lighted keypad 82 that, in turn, includes a plurality of user operable input keys 83. The portable housing 81 also carries a processor 84 that is connected to the infrared sensor 85 and the optical source 87 for lighting the keypad 82 via the optical guide 91. A display 88 is illustratively carried by the upper portion of the portable housing 81 and is also connected to the processor 84.

The cellular phone 80 may also include a power source, such as a rechargeable battery 92, carried by the portable housing 81 and connected to the processor 84 and other electronic components within the housing as will be appreciated by those skilled in the art. A memory 94 is also connected to the processor 84.

The infrared sensor 85 includes an integrated circuit substrate 102 and a plurality of infrared sensing pixels 103 on the integrated circuit substrate for sensing infrared radiation naturally emitted from subdermal features of the user's finger 100. The processor 84 is connected to the infrared sensing pixels 83 for generating the infrared biometric data based upon naturally emitted radiation from subdermal features of the user's finger 100.

The processor 84 further illustratively includes a matcher 104 for determining a match between the infrared biometric data of the user's finger and stored infrared biometric data for an enrolled user. This match determination, in turn, may be used by a function enabler 105 of the processor 84 to enable at least one device function, such as permitting operation of the transmit and receive functions of the cellular telephone 80, for example. The matcher 104 and enabler 105 may be implemented on a CPU of the processor 84 operating under stored program control, as will be appreciated by those skilled in the art without requiring further discussion herein.

Those of skill in the art will appreciate other device functions that may be controlled, such as access to data if the electronic device were a PDA, for example. Of course, many other electronic devices may benefit from the infrared finger sensing, and these devices may include other access limiting functions. The infrared biometric data may be accurately and efficiently obtained using the compact integrated circuit-based sensor 85.

Another aspect of the infrared sensor 85 is that its processing may be self-contained on the integrated circuit substrate 102 itself, or, as shown in the illustrated embodiment, the integrated circuit may contain some of the processing circuitry 107. For example, pixel reading amplifiers and/or other image processing active devices may be provided on the substrate 102 using conventional CMOS technology, for example. In yet other embodiments, all or a majority of the signal processing circuitry may be located off-chip. The integrated circuit substrate 102 may preferably a silicon substrate as will be appreciated by those skilled in the art.

The illustrated embodiment of the infrared sensor 85 is a static placement sensor. In other words, the size of the array of pixels 103 is relatively large compared to a sliding placement sensor as discussed below. Also, for the static placement sensor 105, the processor 104 generates the infrared biometric data based upon static placement of the user's finger adjacent the integrated circuit substrate 102.

Figure 2:
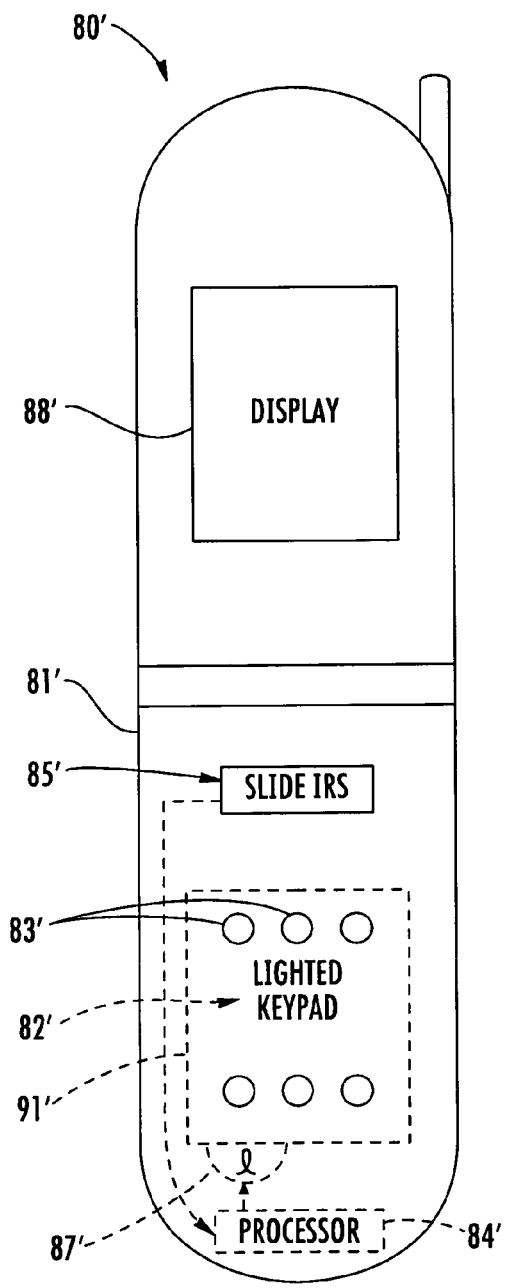
FIG. 2 is a schematic diagram of a second embodiment of an electronic device including an infrared finger sensor in accordance with the present invention.

Referring now more particularly to FIGS. 2 and 4, another class of embodiments of infrared finger sensor 85' is now described. In these embodiments, the illustrated infrared sensor 85' is in the form of a sliding placement sensor that has a smaller sensing area over which the user slides his finger 100' as will be appreciated by those skilled in the art. In these embodiments, the processor 104' may collect frames of infrared image data from the infrared sensing pixels 103'.

Those other elements of the embodiment of the cellular telephone 80' shown in FIGS. 2 and 4 are similar to those of the embodiment of the cellular telephone 80 described above with respect to FIGS. 1 and 3, and are indicated with prime notation. Accordingly, these elements require no further discussion herein.

Figure 5:
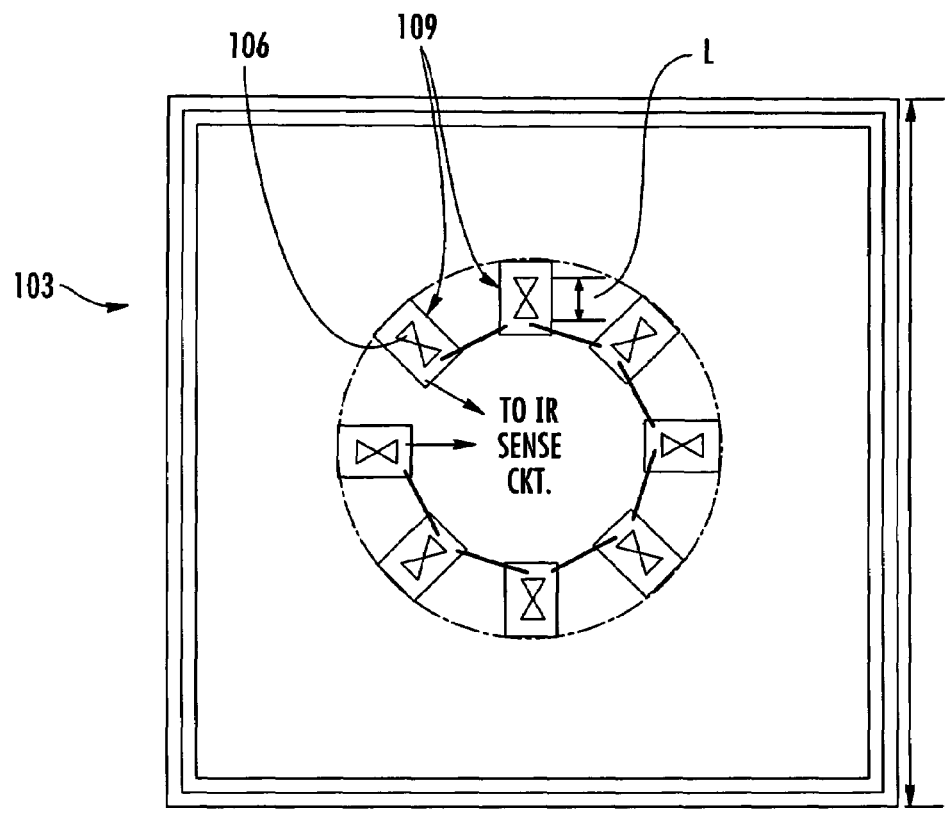
FIG. 5 is a schematic plan view of an embodiment of an infrared sensing pixel for the infrared sensor as shown in FIG. 2.

Turning now additionally to FIGS. 5 through 11, other general aspects of exemplary infrared sensing pixels 103 are now described. As shown in FIG. 5, for example, the infrared sensing pixel 103 includes an array of infrared sensing units 105 connected in series and whose output is fed to an infrared sensing circuit as described in greater detail below. Each sensing unit 105 includes an infrared antenna in the form of a bowtie dipole antenna 106 having a relative small dimension to efficiently collect infrared energy as will be appreciated by those skilled in the art. For example, for infrared radiation at a wavelength of about 7 microns, the length L of the dipole antenna 106 may be about 3.5 microns. The overall size of the infrared sensing pixel 103 may be about 50 microns on each side as is consistent with the dimensions of a typical electric field sensing pixel as will be described in greater detail below. The infrared sensing pixels 103 may be at a density of 125 pixels per inch to capture subdermal patterns, and about 250 for ridge/valley imaging. Of course, other dimensions and types of infrared antennas may also be used as will be appreciated by those skilled in the art.

Figure 6:
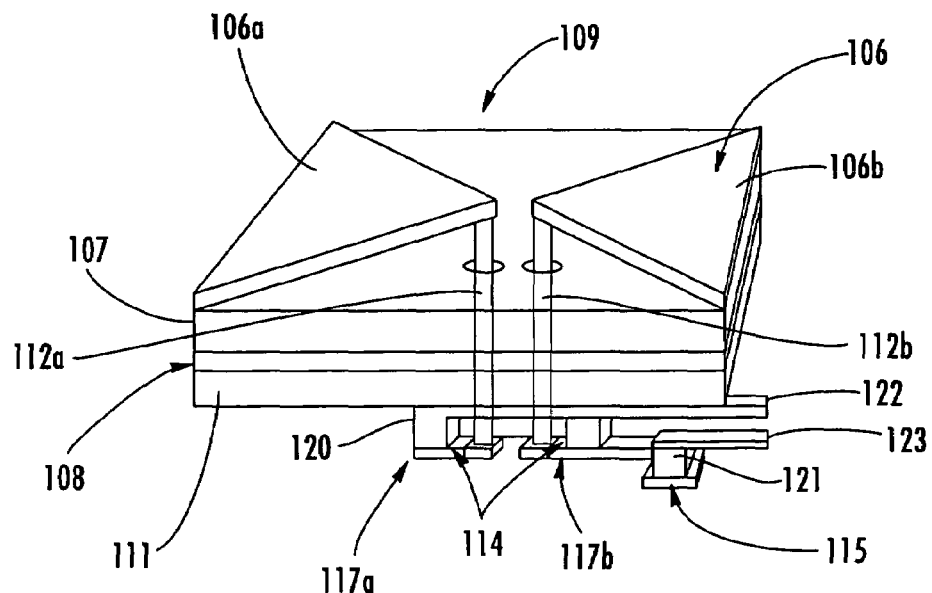
FIG. 6 is a schematic perspective view, partially in section, of an individual infrared antenna and thermocouple temperature sensor for the infrared sensing pixel as shown in FIG. 5.
Figure 7:
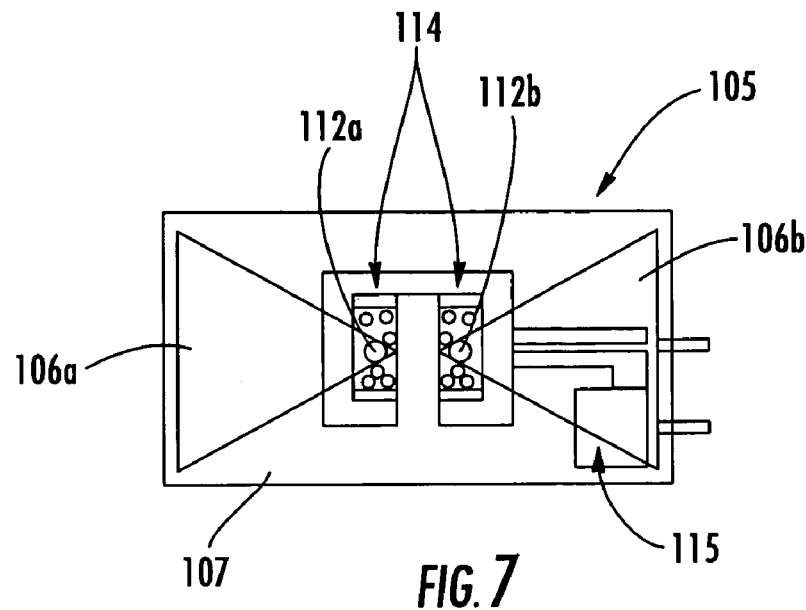
FIG. 7 is a top plan view of the infrared antenna element and thermocouple sensor as shown in FIG. 6.
Figure 9:
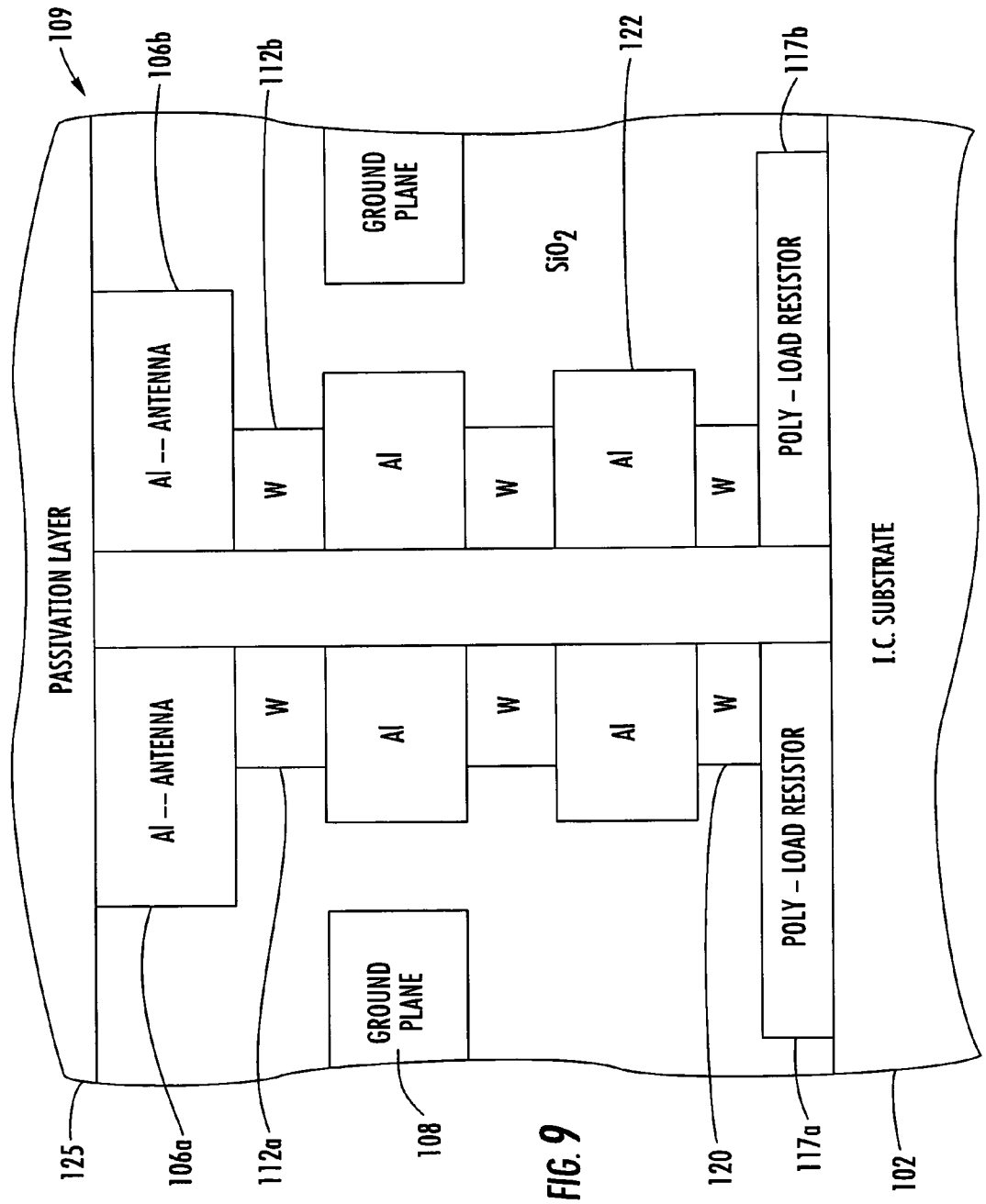
FIG. 9 is an enlarged schematic cross-sectional view through the middle of an individual infrared antenna and temperature sensor as shown in FIG. 6.

As shown in FIGS. 6, 7 and 9, the infrared sensing unit 109 may be advantageously formed using the various metal and polycrystalline layers, separated by interlevel dielectric layers, as are commonly used in semiconductor device processing. In the illustrated embodiment, the upper metal layer is patterned to form the two dipole antenna elements 106a, 106b of the bowtie dipole antenna 106. An interlevel dielectric layer 107 separates the dipole elements 106a, 106b from the underlying antenna ground plane 108 provided by patterning the second metal layer as will be appreciated by those skilled in the art. Another interlevel dielectric layer 111 separates the conductive antenna ground plane 108 from the circuitry patterned using the first metal layer.

Two conductive vias 112a, 112b carry the signal from the dipole antenna elements 106a, 106b to a temperature sensor in the form a thermocouple having a measuring junction 114 and a reference junction 115. Polysilicon dissipative regions 117a, 117b are used to match the impedance of about 300 ohms. Tungsten via portions 120, 121 illustratively connect to aluminum signal lines 122, 123, respectively, patterned on the first metal layer. The thermocouple junctions are defined between the polysilicon of the first poly layer and the aluminum of the first metal layer as will be appreciated by those skilled in the art. The reference junction 115 is also shown relatively close to the measuring junction 114 for clarity of explanation; however, in other advantageous embodiments, the reference junction may be spaced considerably further away from the measuring junction. As will also be understood by those of skill in the art, an upper passivation layer 125 (FIG. 11) is also provided over the dipole antenna 106.

The infrared unit 105 uses a thermocouple rather than a resistor, for example, to reduce power dissipation during imaging. Of course, in other embodiments, a resistor or bolometer may be used as the temperature sensor. Each infrared unit 105 may generate an output voltage of about 0.2 to 20 microvolts, for example.

Figure 8:
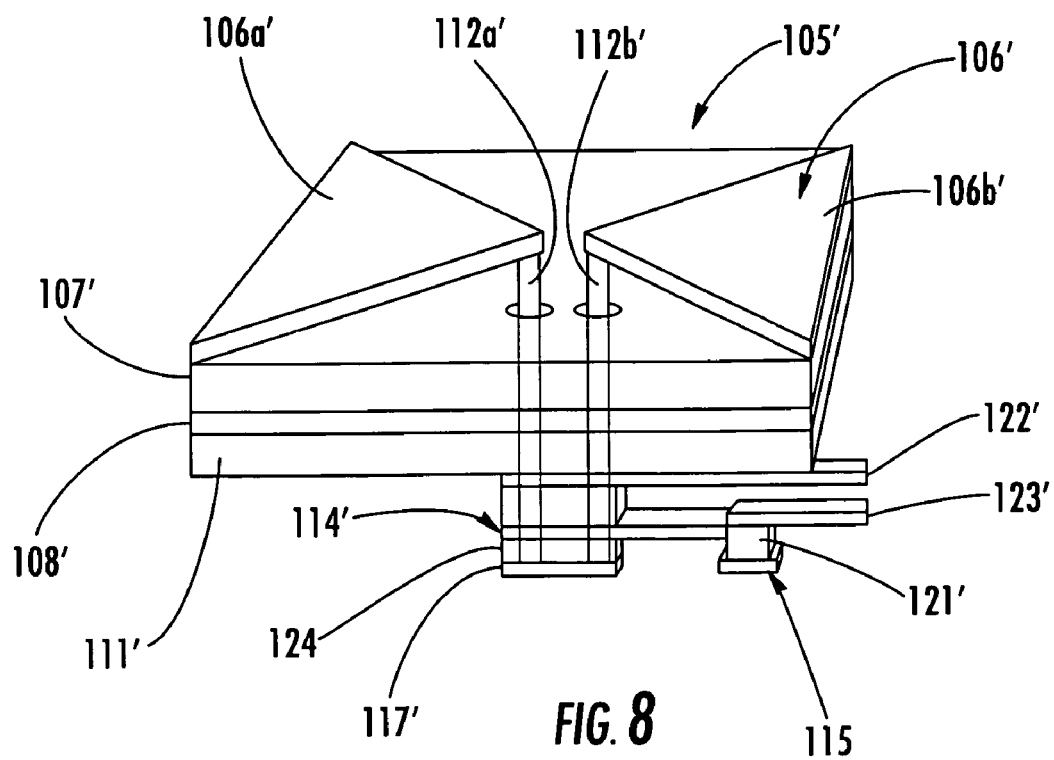
FIG. 8 is a schematic perspective view, partially in section, of an alternate embodiment of an individual infrared antenna and thermocouple temperature sensor for the infrared sensing pixel as shown in FIG. 5.

Another embodiment of an infrared sensing unit 105' is explained with reference to FIG. 8. In this embodiment, the dropping resistor is provided by a portion of the substrate 117'. The ohmic region could also be the channel of an FET allowing modulation of the power dissipated by changing the gate voltage. The conductive vias 112a', 112b' allow conduction of the current wave from the dipole antenna 106' through to the lower layers of the integrated circuit device. In addition, a dielectric layer 124 is provided that may provide additional ESD protection as will be understood by those of skill in the art. Those other elements of the embodiment of FIG. 8, not specifically mentioned, are indicated by prime notation and are similar to elements described above with reference to FIGS. 6 and 7.

Figure 10:
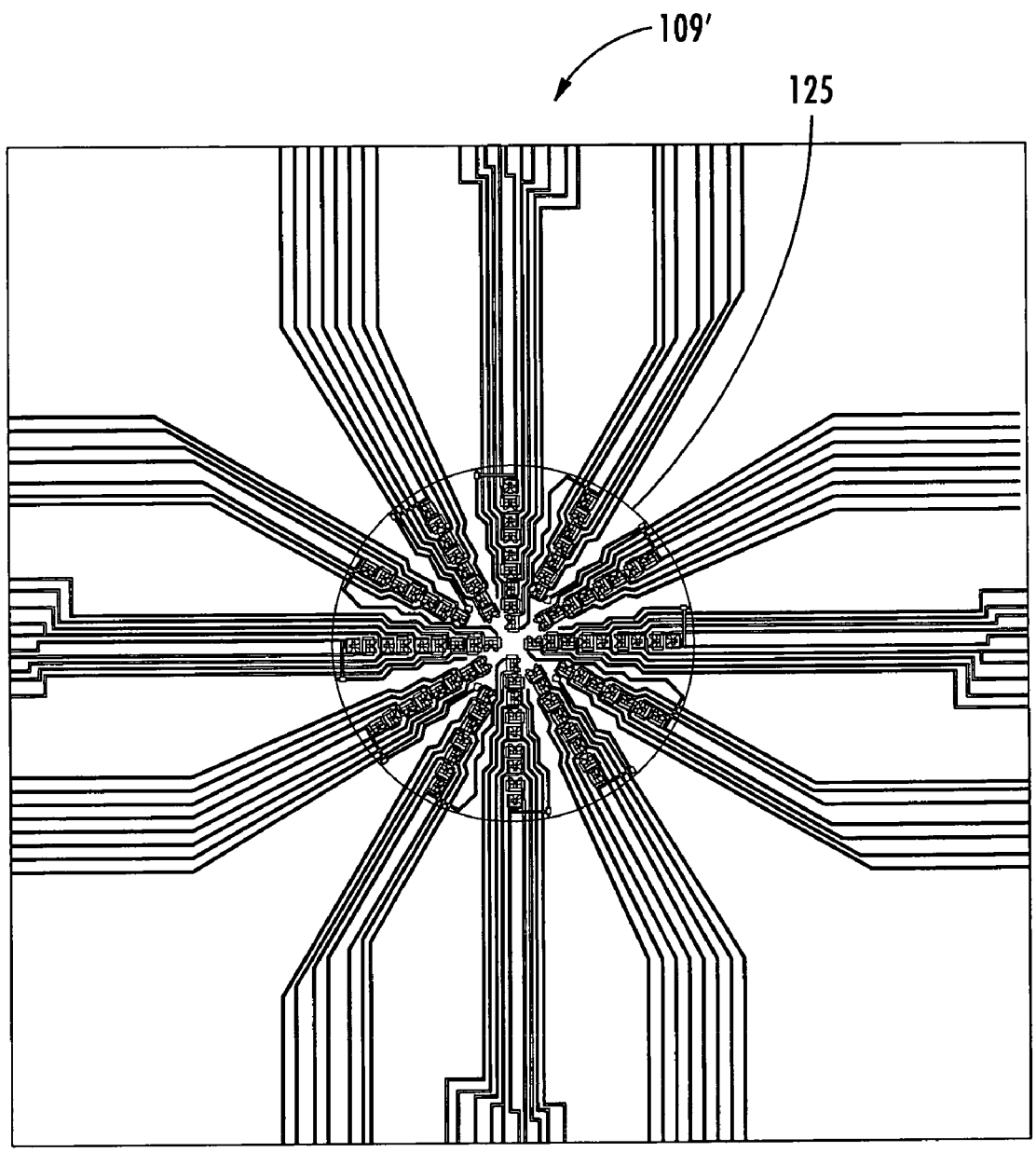
FIG. 10 is a top plan view of an individual infrared sensing pixel as may be used in the infrared sensor as shown in FIG. 1.
Figure 11:
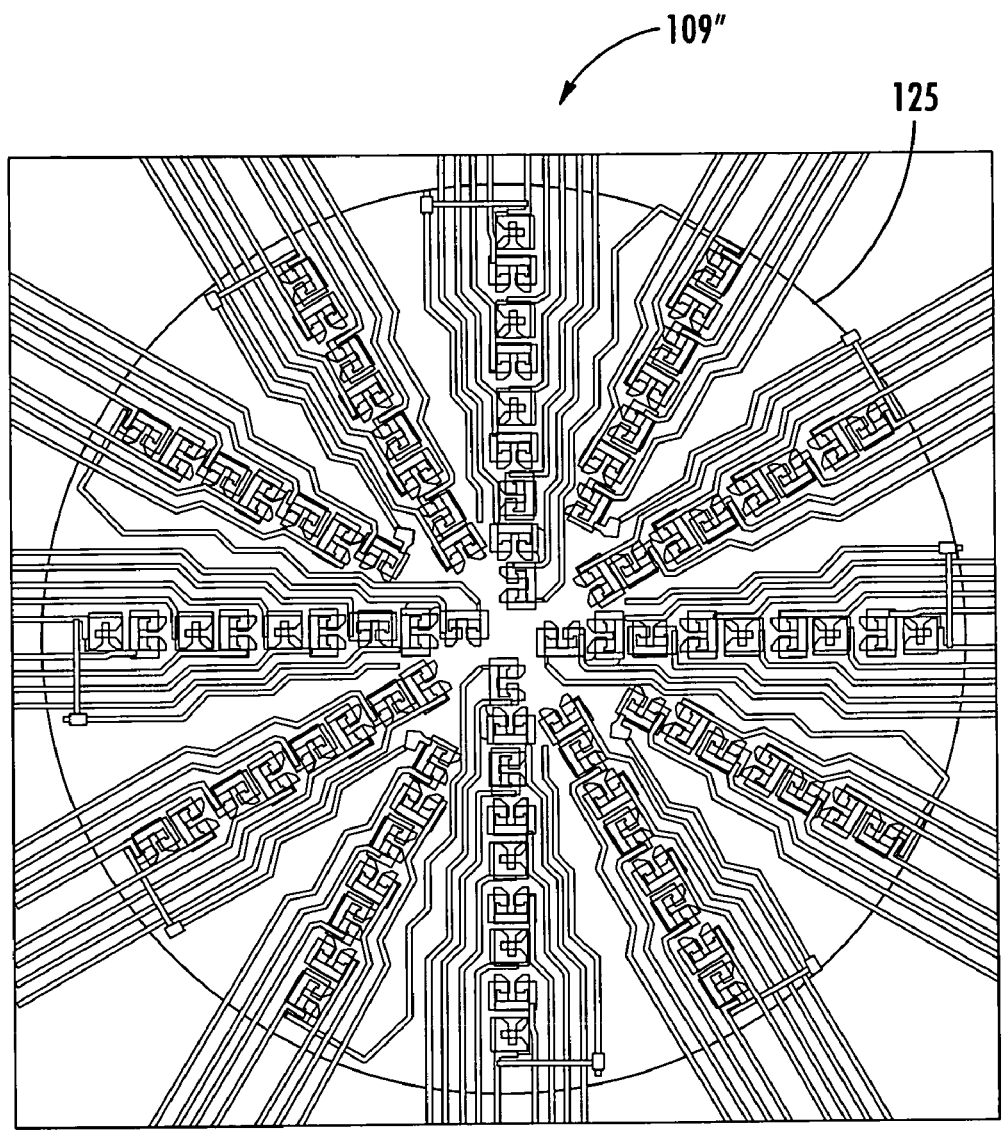
FIG. 11 is an enlarged top plan view from the center portion of FIG. 10.

As shown in top plan views of FIGS. 10 and 11, radial strings of infrared antennas are positioned within a circular aperture 125 through the ground plane of an infrared sensing pixel 103. The measuring junctions are positioned beneath the infrared antennas, while signal lines connect to the reference junctions that are positioned on the periphery of the overall pixel. The reference junctions are therefore obscured from the infrared radiation by the ground plane as will be appreciated by those skilled in the art. Of course, other layouts for the infrared pixels 103, 103' are also contemplated.

Referring again to FIGS. 1 through 11, another method aspect of the invention directed to infrared finger sensing is now described. The method may include receiving a user's finger 100, 100' adjacent an integrated circuit substrate 102, 102', and sensing infrared radiation emitted from subdermal features of the user's finger 100, 100' positioned adjacent the integrated circuit substrate by using a plurality of infrared sensing pixels 103, 103' on the integrated circuit substrate. Each infrared sensing pixel 103, 103' may comprise at least one temperature sensor, such as the thermocouple junctions 114, 115 and 114', 115' described above, and at least one infrared antenna 106, 106' above and connected to the at least one temperature sensor. The method may also include generating infrared biometric data based upon infrared radiation emitted from the subdermal features of the user's finger.

U.S. Pat. No. 5,351,303 to Willmore schematically discloses a contact sensor for reading the infrared profile of the finger, but no successful implementation of the method described is known to date. Such an infrared sensor may suffer from sensitivity to both conducted thermal energy and radiated thermal energy. In the finger contact application, the conducted thermal energy is generally dominant, and in it the pattern of the finger surface friction ridges dominates. The patterns of the subdermal sources, such as the arterial blood supply are overwhelmed by the strong ridge pattern signal. While reading the friction ridge pattern can be useful, that is not typically required for the infrared sensors in the multi-biometric sensor embodiments. In this case, the friction ridge pattern is noise, and the pattern of the subdermal features sources is the unique data the sensor is attempting to capture.

The infrared sensor arrays of the prior art may also suffer from the omni-directional sensitivity pattern of the pixels. Crosstalk between pixels may become a debilitating problem if the thermal structures to be imaged are farther away from the array than 3 or 4 times the pixel pitch. This is indeed the case when imaging the subdermal structures of the finger. To be successful, the pixels should have some form of focusing that minimizes crosstalk. The infrared sensors 85, 85' as disclosed herein may use a differential thermal sensing that rejects heat conducted through the surface of the device (that contains primarily the friction ridge pattern) and detects radiant infrared heat (which contains patterns primarily representative of the subdermal arterial blood distribution). The antenna and temperature sensor structure provides the focusing to reduce or minimize crosstalk between the pixels and develop clean image of the subdermal thermal pattern. The infrared sensors 85, 85' can be fabricated in existing standard CMOS silicon foundry processes as will be appreciated by those skilled in the art.

Figure 12:
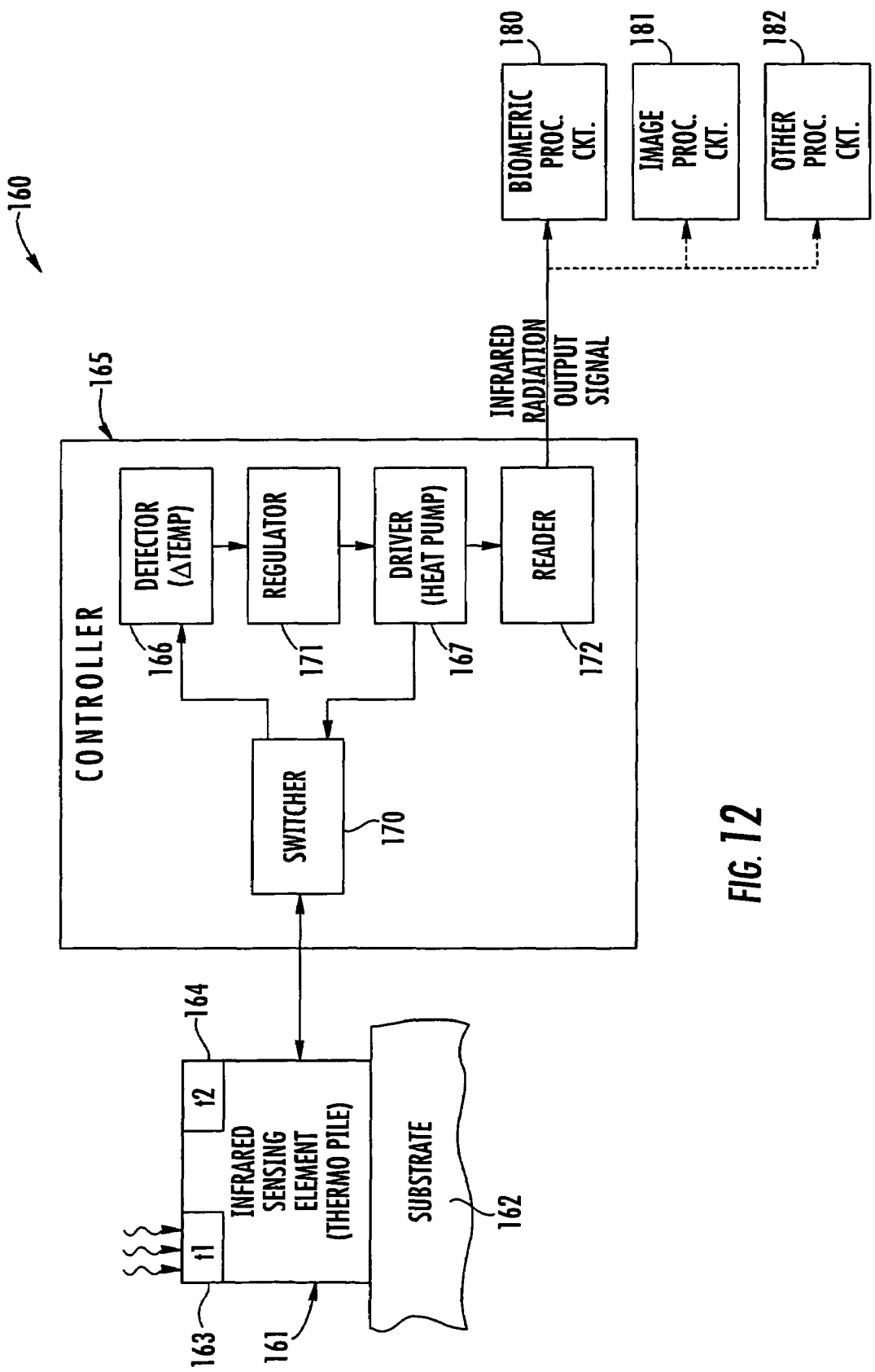
FIG. 12 is a schematic diagram of the infrared sensing pixel and associated controller as may be used in the devices of FIGS. 1 and 2.

Turning now additionally to FIG. 12, the differential thermal sensing approach in accordance with the present invention is now described in a greater level of detail. The illustrated integrated circuit sensor 160 includes an infrared sensing element 161 on a substrate 162 that, in turn, includes a first thermocouple junction 163 heated from infrared radiation, a second thermocouple junction 164 connected to first thermocouple junction, and a controller 165. The substrate 162 may be an integrated circuit substrate, such as comprising silicon or other similar material as will be appreciated by those skilled in the art.

The controller 165 may detect a temperature difference between the first (hot or measuring) thermocouple junction 163 and the second (cold or reference) thermocouple junction 164, and may pump heat therebetween to drive the detected temperature difference toward a desired value. Of course, the controller 165 illustratively generates an infrared radiation output signal based upon the heat pumped. For example, the controller 165 may alternatingly switch between detecting the temperature difference and pumping heat, and the desired temperature difference may be zero. The sensor 160 is readily made using integrated circuit processing technology, and may, for example, be used in many types of applications, such as biometric identification by including the biometric processing circuitry 180 connected to the controller 165. The controller 165 may also output the infrared radiation signal to image processing circuitry 181 or other types of processing circuitry 182 as will be appreciated by those of skill in the art.

The controller 165 includes a detector 166 for detecting a voltage between the first thermocouple junction 163 and the second thermocouple junction 164 indicative of a temperature difference therebetween. The controller 165 also illustratively includes a driver 167 for driving current through the thermocouple junctions 163, 164 to pump heat therebetween. The controller 165 also includes a switcher 170 for alternatingly switching the first and second thermocouple junctions 163, 164 between the detector 166 and the driver 167. In addition, the controller 165 also includes a regulator 171 to operate the driver 167 responsive to the detector 166 so that the detected voltage is driven toward zero, for example. The controller also includes a reader 172 connected to the driver 167 for determining the drive current provided thereby indicative of the heat pumped.

As will be described further below, the second thermocouple junction 164 may be thermally coupled to the substrate 162 via a lower thermal resistance than the first thermocouple junction 163. The integrated circuit sensor 160 may also comprise at least one solid layer between the substrate 162 and the first thermocouple junction 163 so that there is no void therebetween. This may greatly streamline manufacturing and/or reduce manufacturing costs. For example, the at least one solid layer may comprise at least one oxide layer, such as silicon oxide widely used as an interlevel dielectric in integrated circuit processing. Of course, in other embodiments, the more complicated thermal isolation structures incorporating voids and/or bridge elements may also be used.

The sensor 160 may include a plurality of infrared sensing elements 161 for many typical applications. Accordingly, the second thermocouple junctions 164 of the plurality of infrared sensing elements may be thermally coupled to the substrate 162. As noted above, the infrared sensing element 161 may further comprise an infrared radiation antenna, such as the bowtie dipole antenna element 106 (FIG. 6), thermally coupled to the first thermocouple junction 163. As will also be appreciated by those skilled in the art, the infrared sensing element 161 may include a plurality first and second thermocouple junctions 163, 164 connected together to define a thermopile to generate larger signal amplitudes.

Another aspect of the invention is directed to a method for infrared sensing using an integrated circuit sensor 160. The method may include detecting a temperature difference between the at least one first thermocouple junction 163 and the at least one second thermocouple junction 164; pumping heat between the at least one first thermocouple junction and at least one second thermocouple junction to drive the detected temperature difference toward a desired value; and generating an infrared radiation output signal based upon the heat pumped.

Turning now additionally to FIG. 13, a digital embodiment of the infrared sensing integrated circuit 160 is now described. This circuit 160 uses a thermopile on the substrate 162 that is continuously, alternatingly, switched between heat pumping mode and heat sensing mode by the switcher 170 driven by the thermopile mode switch clock signal. The second thermocouple junction 164 is thermally coupled to the substrate by the schematically illustrated thermal link 194.

The controller 165 provides closed loop temperature difference regulation that operates to minimize the temperature difference between the first and second junctions 163, 164. Whenever the temperature difference between the junctions 163, 164 is positive as determined at comparator 190, which serves as the temperature difference detector, and as indicated by the positive voltage measured during the measurement phase of the cycle, current is driven through the thermopile, during the heat pumping phase of the cycle, causing thermal energy to be driven from the first junction 163 to the second junction 164. The current is driven by the pumping current control switch 191 as driven by the output of the NAND gate 192 that, in turn, is fed by the thermopile mode switch clock. The NAND gate 192 is also fed by the D-type latch 193 that is clocked by the comparator read sync signal.

In this embodiment, the heat flux pumped through the thermopile operating in the heat pump or Peltier mode is proportional to the average pulse rate of the current source. This pulse signal as output from the NAND gate 191 in the illustrated embodiment may be fed to a counter, not shown, to generate the measurement. Alternatively, the pulse signal could be simply analog averaged, to generate an analog signal representing the heat flux as will be appreciated by those skilled in the art. The measurement can be scaled by changing the magnitude of the current in the current source driving the heat pump mode. The circuit can also be scaled by modifying the duty cycle of the pump current. Each of these approaches can generate a scaling range in excess of 10 to 1 for a composite scaling range in excess of 100 to 1.

Zero offset in the comparators 190 that varies from pixel to pixel, or varies over time or with temperature can become a significant source of error in the sensor 160. A switched auto-zero circuit can be added to the comparator 190 to null out the offset voltage inherent in the CMOS comparator. The comparator 190 can be isolated from the rest of the circuit during the heat pumping phase and the offset measured during that time. It may also be desirable to isolate the comparator 190 from the possible larger voltages applied during the heat pumping phase in any event. The offset value can then be held on a small capacitor, not shown, for use in compensation during the measurement phase.

Turning additionally to FIG. 14, an analog embodiment of the infrared sensor 160' and its controller 165' are now described. In this embodiment, an analog control loop is used to drive the temperature difference between the first and second thermocouple junctions 163', 164' to zero. A switched, auto-zeroed differential amplifier 195 is used with the auto zero cycle executed during the heat pumping phase. The proportional plus integral controller 196 can drive the temperature difference closer to zero that the closed-loop-gain-limited accuracy of a simple proportional controller, for example, as will be appreciated by those skilled in the art. In this embodiment, a sample and hold circuit 197 is provided between the output of the amplifier 195 and the proportional plus integral controller 196 and both are clocked from the measurement read sync signal as will also be appreciated by those skilled in the art. In addition, the proportional plus integral controller 196 also provides an analog signal output that may be received by an analog-to-digital converter, not shown to generate the infrared output signal. Those other elements and indicated by prime notation, are similar to the elements described above and need no further discussion herein.

In an uncooled array application of these types of infrared sensors 160, 160' the heat sink or substrate will tend toward the average temperature of all of the pixels. In some pixels then the first junction 163, 163' will be warmer that the second junction 164, 164', and in some pixels the first junction will be cooler than the second junction. Accordingly, in these embodiments it may be desirable to be able to run the heat pumping in either direction. The result is to increase the contrast. This can also be accomplished from a single sided power supply circuit by using switches to reverse the connections of the current driver and its ground. An advantage of this approach is that the image does not decay with time as the sense array substrate approaches the average temperature of the target. In arrays requiring minimum per-pixel circuitry, the differential amplifier zero offset can be handled by double sampling, once for the temperature signal and once for the offset signal, and subtracting out the offset before executing the control loop and setting the pumping current.

Figure 15:
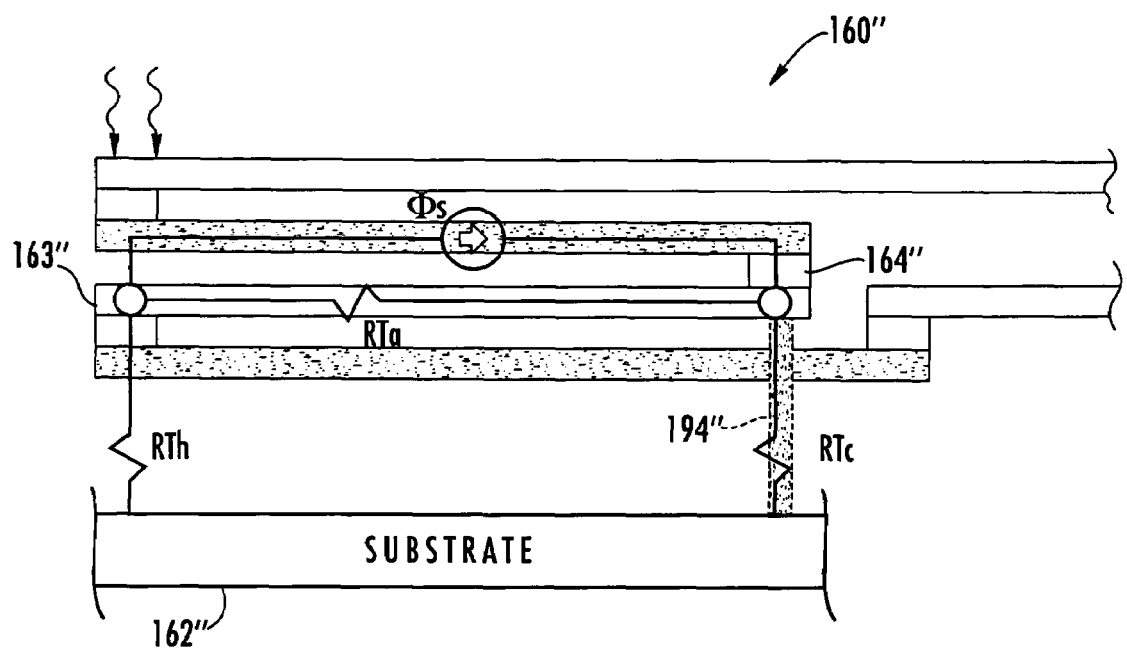
FIGS. 15 and 16 are schematic diagrams modeling the thermal relationships of the infrared sensing pixel as shown in FIG. 12.

Turning now additional to FIG. 15, further features and advantages of the sensor 160" are now discussed. The substrate 162" under the thermocouple junctions 163", 164" may be undoped crystalline silicon that has a fairly low thermal conductivity. The metal two plate (not shown) may be adjacent to the second or cold junction region and provide a heat sink in that area, but is removed in the area of the first or hot junction. If the heat pump approach is used, heat will be drawn through the polysilicon from the hot junctions to the cold junctions, and from there dissipate through the metal two plate. If heat is pumped from the first to the second junction so that the temperature difference between these junctions 163", 164" can be made to approach zero, then the heat flow through the aluminum as represented by RTa will be small. Furthermore, heat flow from the thermocouple junctions to their local environment, represented by the substrate, will then be proportional to the ratio of the thermal resistances, RTh/RTc. If that ratio can be kept fairly high, then the large majority of the heat coming into the first junction 163" will flow through the heat pump; hence, the pumping rate, and therefore the pump drive current, will directly represent the incoming heat flux.

Heat generated by ohmic dissipation in the thermocouple legs will appear equally split between the first and second junctions 163", 164". In traditional Peltier refrigeration, the $I^2R$ heat generation limits the current that can usefully be applied to achieve cooling. In the case of this measurement scheme the $I^2R$ heat generation term appears as an error in the measurement. It is possible to subtract out this error, up to the point where the error signal and its variability swamps the signal of interest as will be appreciated by those skilled in the art. Thermocouples with shorter legs will have less error due to the lower ohmic resistance, but will have more error induced by thermal conductivity along the shorter legs. If the temperature difference can be brought sufficiently close to zero, the errors induced by the thermal conductivity can be minimal. This suggests that the shorter leg thermocouples in the smaller pixels may benefit more from the heat pumping scheme that the larger pixels with longer legs.

Figure 16:
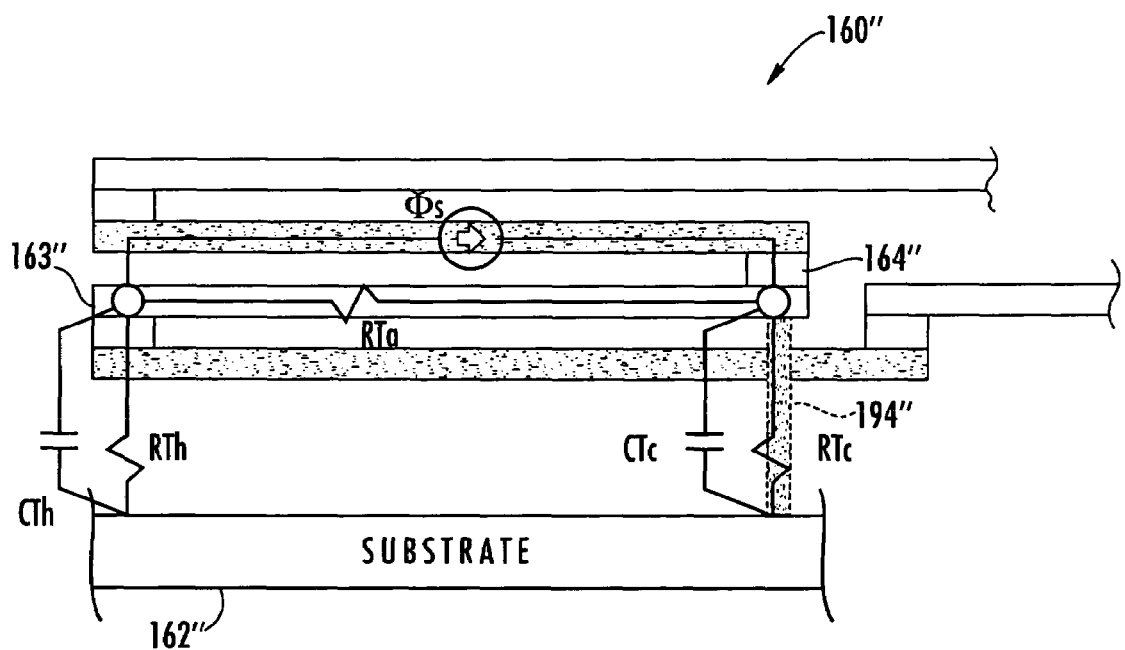

Referring now additionally to FIG. 16, dynamic thermal behavior is further described. The dynamic behavior of the sensor 160" is important to the design of the control loop that minimizes the temperature difference. The time response of the measurement loop will be limited by the thermal time constants as will be appreciated by those skilled in the art. As illustrated, there is a thermal capacity component CTh, CTc for each junction 163", 164" as effects the time constants.

Figure 17:
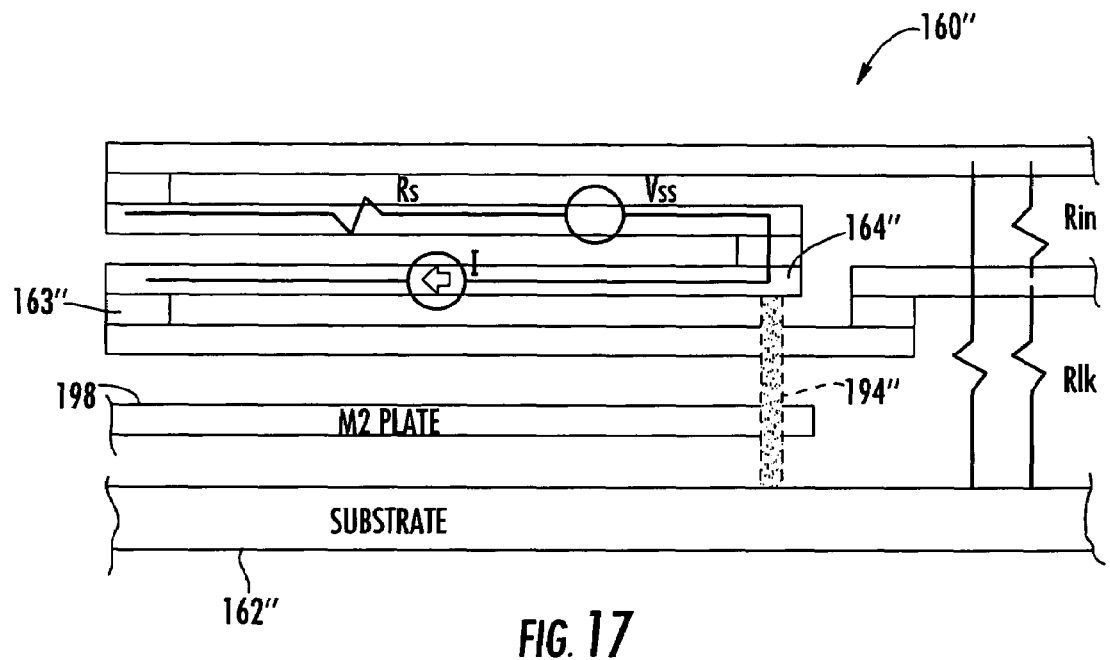
FIGS. 17 and 18 are schematic diagrams modeling the electrical relationships of the infrared sensing pixel as shown in FIG. 12.
Figure 18:
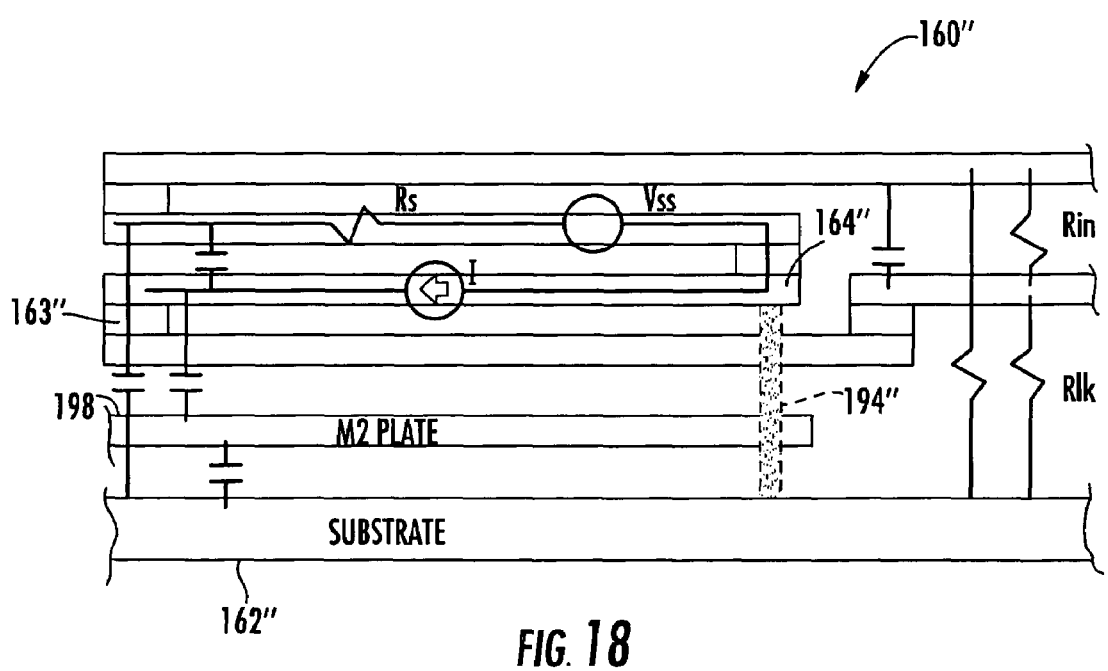

Referring now additionally to FIGS. 17 and 18, additional electrical circuit models for the infrared sensor 160" are now described. The electrical model illustrated in FIG. 17 illustrates the position of the metal two plate 198 and assumes that the aluminum legs of the thermocouples have negligible contribution to both the overall electrical resistance of the circuit and the Seebeck voltages generated by the circuit. During the measurement phase, Rin is the amplifier input resistance, and Rlk are the leakage resistances. Rin and Rlk are different when the circuit is in measurement mode versus heat pumping mode. FIG. 18 illustrates the various parasitic capacitances to also be considered as will be appreciated by those skilled in the art.

The infrared sensors and related methods disclosed herein are particularly advantageously used in biometric identification, such as upon imaging the subdermal features of the finger. Of course, this infrared image collection can be used in combination with other biometrics as disclosed in the parent U.S. patent application Ser. No. 10/935,468, filed Sep. 3, 2004. Many other uses for the infrared sensors are also possible as will be appreciated by those skilled in the art. In addition, the integrated circuit heat sensing techniques described herein may be readily used for other heat sensing applications, such as based upon convection or conduction of heat, for example. Accordingly, many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims That which is claimed is:

1. An integrated circuit sensor comprising:
    a substrate; and
        at least one infrared sensing element on said substrate and comprising
            at least one first thermocouple junction heated from infrared radiation,
            at least one second thermocouple junction connected to said at least one first thermocouple junction, and
            a controller detecting a temperature difference between said at least one first thermocouple junction and said at least one second thermocouple junction, and pumping heat between said at least one first thermocouple junction and at least one second thermocouple junction to drive the detected temperature difference toward a desired value,
            said controller also generating an infrared radiation output signal based upon the heat pumped.

2. The integrated circuit sensor according to claim 1 wherein said controller alternatingly switches between detecting the temperature difference and pumping heat.

3. The integrated circuit sensor according to claim 1 wherein the desired temperature difference is zero.

4. The integrated circuit sensor according to claim 1 further comprising biometric processing circuitry connected to said controller.

5. The integrated circuit sensor according to claim 1 wherein said controller comprises:
    a detector for detecting a voltage between said at least one first thermocouple junction and said at least one second thermocouple junction indicative of a temperature difference therebetween; and
    a driver for driving current through said at least one first thermocouple junction and said at least one second thermocouple junction to pump heat therebetween.

6. The integrated circuit sensor according to claim 5 wherein said controller further comprises:
    a switcher for alternatingly switching said at least one first thermocouple junction and said at least one second thermocouple junction between said detector and said driver;
    a regulator to operate said driver responsive to said detector so that the detected voltage is driven toward zero; and
    a reader connected to said driver for determining the drive current provided thereby indicative of the heat pumped.

7. The integrated circuit sensor according to claim 1 wherein said at least one second thermocouple junction is thermally coupled to said substrate via a lower thermal resistance than said at least one first thermocouple junction.

8. The integrated circuit sensor according to claim 1 further comprising at least one solid layer between said substrate and said at least one first thermocouple junction so that there is no void therebetween.

9. The integrated circuit sensor according to claim 8 and wherein said at least one solid layer comprises at least one oxide layer.

10. The integrated circuit sensor according to claim 1 wherein said at least one infrared sensing element comprises a plurality thereof.

11. The integrated circuit sensor according to claim 10 wherein said second thermocouple junctions of said plurality of infrared sensing elements are thermally coupled to said substrate.

12. The integrated circuit sensor according to claim 1 wherein said at least one infrared sensing element further comprises an infrared radiation antenna thermally coupled to said at least one first thermocouple junction.

13. The integrated circuit sensor according to claim 1 wherein said at least one first thermocouple junction comprises a plurality thereof connected together; and wherein said at least one second thermocouple junction comprises a plurality thereof connected together.

14. An integrated circuit sensor comprising:
a substrate; and
a plurality of infrared sensing elements on said substrate, each infrared sensing element comprising
at least one first thermocouple junction heated from infrared radiation,
at least one solid layer between said substrate and said at least one first thermocouple junction so that there is no void therebetween,
at least one second thermocouple junction connected to said at least one first thermocouple junction, and
a controller alternatingly detecting a temperature difference between said at least one first thermocouple junction and said at least one second thermocouple junction, and pumping heat between said at least one first thermocouple junction and at least one second thermocouple junction to drive the detected temperature difference toward a desired value.

15. The integrated circuit sensor according to claim 14 wherein the desired temperature difference is zero.

16. The integrated circuit sensor according to claim 14 wherein said controller also generates an infrared radiation output signal.

17. The integrated circuit sensor according to claim 14 further comprising biometric processing circuitry connected to said controller.

18. The integrated circuit sensor according to claim 14 wherein said controller comprises:
a detector for detecting a voltage between said at least one first thermocouple junction and said at least one second thermocouple junction indicative of a temperature difference therebetween;
a driver for driving current through said at least one first thermocouple junction and said at least one second thermocouple junction to pump heat therebetween;
a switcher for alternatingly switching said at least one first thermocouple junction and said at least one second thermocouple junction between said detector and said driver;
a regulator to operate said driver responsive to said detector so that the detected voltage is driven toward zero; and
a reader connected to said driver for determining the drive current provided thereby indicative of the heat pumped.

19. The integrated circuit sensor according to claim 14 and wherein said at least one solid layer comprises at least one oxide layer.

20. The integrated circuit sensor according to claim 14 wherein said second thermocouple junctions of said plurality of infrared sensing elements are thermally coupled to said substrate.

21. The integrated circuit sensor according to claim 14 wherein each of said infrared sensing elements further comprises an infrared radiation antenna thermally coupled to said at least one first thermocouple junction.

22. The integrated circuit sensor according to claim 14 wherein said at least one first thermocouple junction comprises a plurality thereof connected together; and wherein said at least one second thermocouple junction comprises a plurality thereof connected together.

23. An integrated circuit biometric sensor comprising:
a substrate;
a plurality of infrared sensing elements on said substrate, each infrared sensing element comprising
at least one first thermocouple junction heated from infrared radiation,
at least one second thermocouple junction connected to said at least one first thermocouple junction, and
a controller detecting a temperature difference between said at least one first thermocouple junction and said at least one second thermocouple junction, and pumping heat between said at least one first thermocouple junction and at least one second thermocouple junction to drive the detected temperature difference toward a desired value,
said controller also generating an infrared radiation output signal based upon the heat pumped; and
biometric processing circuitry connected to said controllers.

24. The integrated circuit biometric sensor according to claim 23 wherein said controller comprises:
a detector for detecting a voltage between said at least one first thermocouple junction and said at least one second thermocouple junction indicative of a temperature difference therebetween;
a driver for driving current through said at least one first thermocouple junction and said at least one second thermocouple junction to pump heat therebetween;
a switcher for alternatingly switching said at least one first thermocouple junction and said at least one second thermocouple junction between said detector and said driver;
a regulator to operate said driver responsive to said detector so that the detected voltage is driven toward zero; and
a reader connected to said driver for determining the drive current provided thereby indicative of the heat pumped.

25. The integrated circuit biometric sensor according to claim 23 wherein said second thermocouple junctions of said plurality of infrared sensing elements are thermally coupled to said substrate.

26. The integrated circuit biometric sensor according to claim 23 wherein each of said infrared sensing elements further comprises an infrared radiation antenna thermally coupled to said at least one first thermocouple junction.

27. An integrated circuit sensor comprising:
a substrate; and
at least one heat sensing element on said substrate and comprising
at least one first thermocouple junction,
at least one second thermocouple junction connected to said at least one first thermocouple junction, and
a controller detecting a temperature difference between said at least one first thermocouple junction and said at least one second thermocouple junction, and pumping heat between said at least one first thermocouple junction and at least one second thermocouple junction to drive the detected temperature difference toward a desired value,
said controller also generating a heat output signal based upon the heat pumped.

28. The integrated circuit sensor according to claim 27 wherein said controller alternatingly switches between detecting the temperature difference and pumping heat; and wherein the desired temperature difference is zero.

29. The integrated circuit sensor according to claim 27 further comprising biometric processing circuitry connected to said controller.

30. The integrated circuit sensor according to claim 27 wherein said controller comprises:
- a detector for detecting a voltage between said at least one first thermocouple junction and said at least one second thermocouple junction indicative of a temperature difference therebetween;
- a driver for driving current through said at least one first thermocouple junction and said at least one second thermocouple junction to pump heat therebetween;
- a switcher for alternatingly switching said at least one first thermocouple junction and said at least one second thermocouple junction between said detector and said driver;
- a regulator to operate said driver responsive to said detector so that the detected voltage is driven toward zero; and
- a reader connected to said driver for determining the drive current provided thereby indicative of the heat pumped.

31. A method for infrared sensing using an integrated circuit sensor comprising a substrate and at least one infrared sensing element on the substrate, the at least one infrared sensing element comprising at least one first thermocouple junction heated from infrared radiation, and at least one second thermocouple junction connected to the at least one first thermocouple junction, the method comprising:
- detecting a temperature difference between the at least one first thermocouple junction and the at least one second thermocouple junction;
- pumping heat between the at least one first thermocouple junction and at least one second thermocouple junction to drive the detected temperature difference toward a desired value; and
- generating an infrared radiation output signal based upon the heat pumped.

32. The method according to claim 31 further comprising alternatingly switching between detecting the temperature difference and pumping heat; and wherein the desired temperature difference is zero.

33. The method according to claim 31 further comprising processing the infrared radiation output signal for biometric identification.

34. The method according to claim 31 wherein detecting comprises detecting a voltage between the at least one first thermocouple junction and the at least one second thermocouple junction indicative of a temperature difference therebetween; wherein pumping heat comprises driving current through the at least one first thermocouple junction and the at least one second thermocouple junction to pump heat therebetween; and wherein generating comprises determining the drive current provided thereby indicative of the heat pumped.

35. The method according to claim 31 wherein the integrated circuit sensor further comprises at least one solid layer between the substrate and the at least one first thermocouple junction so that there is no void therebetween.

36. The method according to claim 31 wherein the at least one infrared sensing element further comprises an infrared radiation antenna thermally coupled to the at least one first thermocouple junction.

* * * * *

UNITED STATES PATENT AND TRADEMARK OFFICE
CERTIFICATE OF CORRECTION

PATENT NO. : 7,351,974 B2  Page 1 of 1
APPLICATION NO. : 11/225140
DATED : April 1, 2008
INVENTOR(S) : Dale R. Setlak It is certified that error appears in the above-identified patent and that said Letters Patent is hereby corrected as shown below:

Column 5, Line 59    Delete: "a"
                     Insert: -- be a --

Column 6, Line 23    Delete: "relative"
                     Insert: -- relatively --

Column 10, Line 40   Delete: "that"
                     Insert: -- than --

Column 11, Line 27   Delete: "that"
                     Insert: -- than --

Signed and Sealed this

Nineteenth Day of August, 2008

JON W. DUDAS
*Director of the United States Patent and Trademark Office*